Oct. 20, 1970  R. L. KURTZ ETAL  3,535,014
HYBRID HOLOGRAPHIC SYSTEM USING REFLECTED AND TRANSMITTED
OBJECT BEAMS SIMULTANEOUSLY
Filed Feb. 24, 1969

ROBERT L. KURTZ
BURNICE N. NORDEN
INVENTORS

BY

ATTORNEYS 3,535,014
HYBRID HOLOGRAPHIC SYSTEM USING REFLECTED AND TRANSMITTED OBJECT BEAMS SIMULTANEOUSLY
Robert L. Kurtz, Blacksburg, Va., and Burnice N. Norden, Cookeville, Tenn., assignors to the United States of America as represented by the Administrator of the National Aeronautics and Space Administration
Filed Feb. 24, 1969, Ser. No. 801,312
Int. Cl. G02b 27/00
U.S. Cl. 350—3.5              5 Claims

ABSTRACT OF THE DISCLOSURE

A holographic system utilizing a beam of coherent light comprising, means for dividing the beam into a reference beam for direct transmission to a photographic plate, a direct signal beam for transmission to the photographic plate by transmission through or by the back side of the test object and a reflection signal beam for transmission to the photographic plate by reflection from the front side of test object. The difference in the length of the three light paths is adjusted to be less than the coherence length of the light source and the orientation of the signal beams are positioned so that the change in the length of their paths during the exposure of a moving test object will not adversely affect the interference pattern caused by the reflection signal beam interfering with the reference beam and the direct signal beam and caused by the direct signal beam interfering with the reference beam. To further decrease the mechanical stability requirements of the system a light diffuser is placed in both the direct signal beam arm and the reflection signal beam arm.

ORIGIN OF THE INVENTION

The invention described herein was made by employees of the United States Government and may be manufactured and used by or for the Government of the United States of America for governmental purposes without the payment of any royalties thereon or therefor.

BACKGROUND OF THE INVENTION

This invention relates to holography and more particularly to an improved apparatus for recording and reconstructing three-dimensional objects in coherent light.

Presently, there are several techniques for producing holograms. The general requirements for hologram production are that one uses a coherent beam of radiation as a source and a beam splitter to obtain two coherent beams, one referred to as the signal beam and the other the reference beam. The reference beam is generally allowed to pass directly to a photographic recording plate without any form of disturbance. The signal beam is made incident on the object under test, either by reflection of the signal beam from the test object, or by direct transmission of the signal beam through or by the test object. The test object being placed in the path of the signal beam, imposes a specific modulation on the signal beam. This modulated signal beam is then incident on a photographic plate along with the reference beam. At a given moment, the field pattern produced in the plane of the photographic plate (by the interference between the reference beam and the modulated signal beam) is essentially frozen by the photographic emulsion. This arrested field pattern is not a photograph in the usual sense since there is no image, but is simply a recorded diffraction pattern. The developed photographic plate constitutes a reconstructable hologram. That is, if the developed hologram is placed in the path of the reference beam alone, the image of the object under test is reconstructed. The image of the test object appears in three dimensions with parallax identical to the original test object.

Two types or methods for producing holograms in the past are the reflection method and direct method. The reflection method as the name implies, reflects the signal beam from the test object in a forward direction where it is then directed incident to the photographic plate. When a hologram taken by this method is reconstructed, the test object has excellent resolution since it is front illuminated; however, this method has the disadvantage of extremely stringent requirements on the mechanical stability of the test object and the component parts of the holographic camera. In the direct method the signal beam is transmitted through or by the test object after having first passed through a diffuser plate positioned between the light source and the test object. The direct method has the advantage of partially relaxing the stringent requirements on mechanical stability of the test object but has the disadvantage of poor resolution of detail of the front surface of the test object since the test object is only illuminated from the back.

Accordingly it is an object of this invention to provide an improved holographic system.

Another object of this invention is to provide a holographic system having a high degree of resolution.

Still another object of this invention is to provide a holographic system wherein the requirements of the mechanical stability of the test object is relaxed and a hologram of a moving object may be made.

SUMMARY OF THE INVENTION

According to the present invention it has been found that a holographic system can be made to accomplish the aforementioned objectives by employing three beams, one of which is modulated by the test object as in the reflection method, one of which is modulated by the test object as in the direct method and one of which is utilized as a reference beam. The use of three beams for the production of a hologram is accomplished by orienting the beams so as to cause both modulated beams to interfere with the reference beam and to cause both modulated beams to interfere with one another. The path of the beams are oriented with respect to the motion of the test object so that any change in path length of the beam during the exposure time of the test object will not adversely affect the interference pattern between the beams. Additionally through the use of a light diffuser in the reflection arm the mechanical stability requirement of the system is relaxed.

DESCRIPTION OF THE DRAWING

For a fuller understanding of the nature and objects of the invention reference should be had to the following detailed description taken in connection with the accompanying drawing in which.

DESCRIPTION OF THE PREFERRED EMBODIMENT

Figure 1:
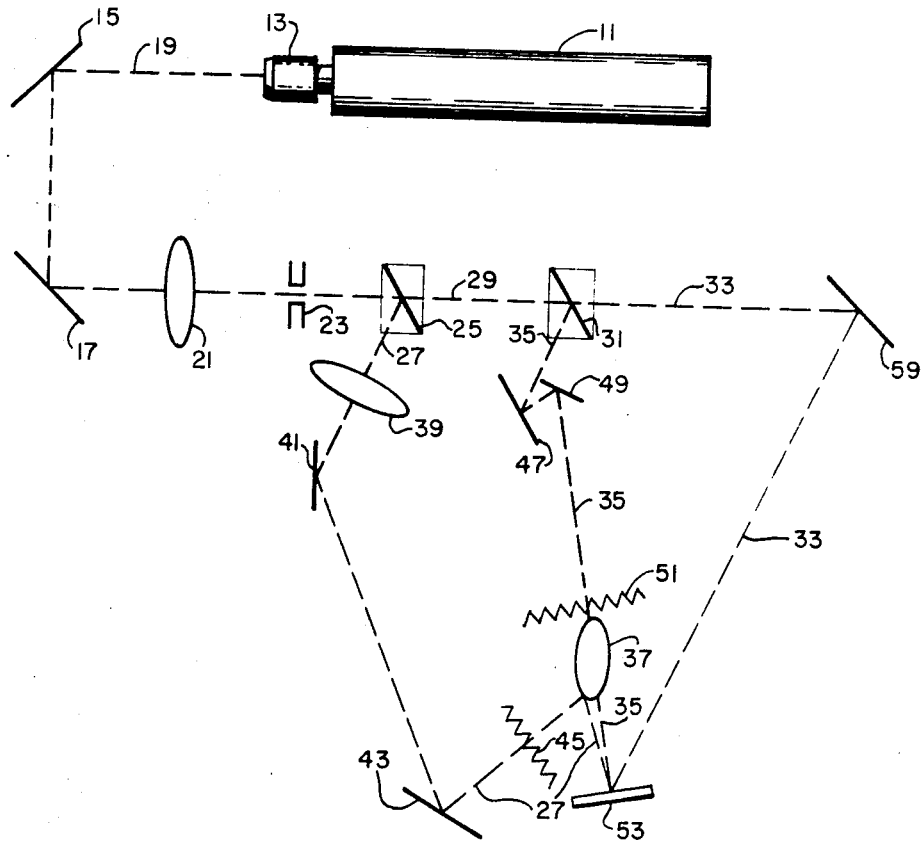
FIG. 1 is a schematic diagram of an embodiment of the invention.

Referring to FIG. 1 there is shown a source of coherent light such as a laser 11. The output beam of radiation of the laser, shown by dashed lines 19, is directed through a spatial filter and collimator 13 to remove unwanted modes of operation of the laser while increasing the spatial coherence of beam 19. Front surface mirrors 15 and 17 are positioned to intercept the output beam of radiation and to direct the beam through lens 21, which increases the uniformity of the intensity of the beam over its circular cross section, and through shutter 23 which serves to control the exposure time. Beam splitter 25 functions to split beam 19 into beam 29 and a first signal beam hereinafter referred to as the reflection signal beam 27. A second beam splitter 31 is positioned to intercept beam 29 so as to form reference beam 33 and a second signal beam hereinafter referred to as the direct signal beam 35.

The reflection signal beam 27 is directed to the front surface of a test object 37 by transmission through a lens 39, which controls the beam cross section, and by reflection from front surface mirrors 41 and 43. In the now preferred embodiment a diffuser 45 is placed in the beam path between mirror 43 and the test object 37. The diffuser 45 may consist of any type of frosted glass and performs the function of providing uniform illumination of the test object 37 and provides a range of angles for beam 27 instead of just one angle. It is noted that with this range of angles in the reflection signal beam the mechanical stability of the system is relaxed since the rays of beam 27 pass the test object at a variety of angles. The reflection signal beam 27 is modulated by reflection from the front surface of the test object and then is made incident on the photographic plate 53.

The second signal beam, that is the direct signal beam 35, is directed via front surface mirrors 47 and 49 through diffuser 51 to the back of the test object 37. A portion of the beam 35 is transmitted through or by the test object 37 which modulates it and is then made incident on the photographic plate 53. Finally the reference beam 33 is directed via front surface mirror 59 directly to the photographic plate 53 without any form of modulation.

In the operation of the present invention the orientation of the reflection signal beam 27, the direct signal beam 35 and the reference beam 33 is adjusted so as to cause the reference beam 33 to interfere with both the modulated reflection signal beam 27 and the modulated direct signal beam 35 and additionally to cause modulated reflection beam 27 to interfere with the modulated direct signal beam 33. To accomplish these three interferences which together are simultaneously recorded on the photographic plate, the three beams must be superimposed at the film plane both in space and in time. To insure that the three beams are superimposed in time, the difference in the length of the beam path of the reflection signal beam 27, the direct signal beam 35 and the reflection beam 33 must be less than the coherence length of the laser 11 so as to cause an overlap at the photographic plate, of radiation from the laser that is coherent with respect to one another.

Figure 2:
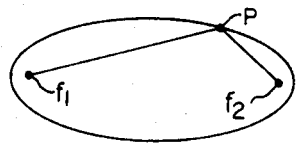
FIG. 2 is a schematic diagram of the orientation of the reflection arm of FIG. 1 in accordance with one embodiment of the invention.

With respect to the taking of a hologram of a moving test object (i.e. a projectile) during the time interval that shutter 23 is open and the test object is illuminated, an intolerable shift in the wavelength of either the reflected signal beam 27 or the direct signal beam 35 would occur if the path length of the respective signal beams was altered by the motion of test object. In the now preferred embodiment the integrity of the direct signal beam 35 is protected by orienting the direct signal beam perpendicular to the motion of the test object. Simultaneously with this orientation of the direct signal beam, FIG. 2 shows an orientation of the reflection beam 27 which may be utilized to eliminate or minimize the change in path length of the reflection arm. The mirror 43 and the photographic plate 53 of FIG. 1 are respectively positioned at two points $f_1$ and $f_2$ in FIG. 2 which coincide with the foci of an ellipse and the test object 37 is positioned at a point $p$ on the curve of the ellipse. If the test object 37 travels in a direction during exposure approximating the path of the curve of the ellipse, the path length of the reflection signal beam 27 will not change, since the geometry of an ellipse the distance from one foci to the other foci via any point on the curve of the ellipse is constant. In practice it has been found that the motion of the test object need only approximate the curve of the ellipse and that the change in length of either signal beam may vary up to ½λ (wherein λ equal the wavelength of the incident coherent radiation). It will also be readily seen that if the operator of the system fails to orient the reflection signal beam 27 correctly, the system will still provide a diffuse type hologram, which in turn indicates that the orientation of the reflection signal beam must be reconsidered.

Thus, the present invention presents a unique method and apparatus which can be utilized to produce holograms of both stationary and moving objects with a decrease in the mechanical stability requirements of the system and an increase in the resolution of the system.

It is understood that the above described embodiment of the invention is merely illustrative of the principles of the invention and other embodiments may be made without departing from the scope of the invention.

We claim:

1. An apparatus for producing a hologram comprising:

a light source for producing a coherent beam of radiation;

beam splitter means positioned to split said coherent beam into a reflection signal beam, a direct signal beam and a reference beam;

a moving test object having a reflective front surface and a transmissive rear surface;

first light reflector means positioned to direct said reflection signal beam to said front surface of said test object;

second light reflector means positioned to direct said direct signal beam to said rear surface for transmission through said test object;

a photographic plate positioned to receive said reflection signal beam after reflection from said test object and said direct signal beam after transmission through said test object whereby said reflection signal beam and said direct signal beam interfere with one another in the plane of said photographic plate;

third reflector means positioned to reflect said reference beam to said photographic plate whereby said reference beam interferes with said reflection and said direct signal beam in the plane of said photographic plate; and shutter means positioned in the path of said coherent beam of radiation for controlling the exposure time of said test object;

and wherein said first light reflector means includes a mirror for directing said reflection signal beam to impinge on said front surface of said test object and wherein said position of said first mirror and said photographic plate correspond respectively to the foci of an ellipse having a curve substantially corresponding to the motion of said test object during its exposure time and wherein said second light reflector means includes a mirror for directing said direct signal beam perpendicular to the motion of said test object.

2. The holographic system of claim 1 including a first diffuser positioned between said second light reflector means and said rear surface of said test object.

3. The holographic system of claim 2 including a second diffuser positioned between said first light reflector means and said front surface of said test object.

4. The method of producing a hologram of a test object moving along a substantially elliptical path and having a front side and a back side comprising:

generating a beam of coherent light;

splitting said beam into a reflection signal beam, a direct signal beam and a reference beam;

transmitting said reflection signal beam by reflection from a first mirror located at one of the foci of said elliptical path to said front surface of said test object and by reflection from said front surface to a photographic plate located at the other focus of said elliptical path, whereby the path length of said reflection signal beam between said mirror and said photographic plate remains substantially constant while said test object is moving;

transmitting said direct signal beam to said photographic plate along a path perpendicular to the motion of said test object by transmission through said test object whereby said direct signal beam interferes with said reflection signal beam in the plane of the photographic plate; and transmitting said reference beam directly to said photographic plate whereby said reference beam interferes with both said reflection and direct signal beams in the plane of the photographic plate.

5. The method of claim 4 including the steps of:
diffusing said reflection signal beam before transmission to said front side of said test object; and
diffusing said direct signal beam before transmission through said test object.

References Cited

Pennington: Microwaves, October 1965, pp. 35–40.

DAVID SCHONBERG, Primary Examiner

R. J. STERN, Assistant Examiner